United States Patent
Fledersbacher et al.

(10) Patent No.: US 6,457,311 B2
(45) Date of Patent: Oct. 1, 2002

(54) EXHAUST-GAS TURBOCHARGER FOR AN INTERNAL COMBUSTION ENGINE

(75) Inventors: Peter Fledersbacher, Stuttgart; Gernot Hertweck, Fellbach; Siegfried Sumser; Juergen Willand, both of Stuttgart; Friedrich Wirbeleit, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/801,830

(22) Filed: Mar. 9, 2001

(30) Foreign Application Priority Data

Mar. 9, 2000 (DE) .......................................... 100 11 419

(51) Int. Cl.$^7$ ................................................ F02B 33/44
(52) U.S. Cl. ...................... 60/605.3; 60/605.1; 417/407
(58) Field of Search ................................ 60/597, 605.1, 60/605.3; 417/407

(56) References Cited

U.S. PATENT DOCUMENTS

| | | | | |
|---|---|---|---|---|
| 4,355,850 A | * | 10/1982 | Okano | .......................... 308/9 |
| 4,523,896 A | | 6/1985 | Lhenry et al. | |
| 4,549,821 A | * | 10/1985 | Kawakami | ................... 384/103 |
| 4,896,975 A | * | 1/1990 | Bescoby et al. | ............. 384/114 |
| 5,921,683 A | * | 7/1999 | Merritt et al. | ............... 384/106 |

FOREIGN PATENT DOCUMENTS

| | | |
|---|---|---|
| DE | 3319112 | 6/1985 |
| DE | 3505048 | 8/1986 |
| DE | 36 28 687 A1 | 8/1986 |
| EP | 0392677 | 5/1993 |
| GB | 2335710 | 9/1999 |
| JP | 57154516 | 9/1982 |
| JP | 59065518 | 4/1984 |
| JP | 59093925 | 5/1984 |
| JP | 61126327 | 6/1986 |

* cited by examiner

Primary Examiner—Hoang Nguyen
(74) Attorney, Agent, or Firm—Crowell & Moring LLP

(57) ABSTRACT

An exhaust-gas turbocharger for an internal combustion engine has an exhaust-gas turbine in the exhaust tract and a compressor in the intake tract, the exhaust-gas turbine and the compressor being connected via a shaft which is supported in a casing of the exhaust-gas turbocharger via at least one bearing. In order to improve the efficiency of the turbocharger, the bearing has a non-contact design, in that, when the exhaust-gas turbocharger is in operation, the shaft is held at a distance from, and so as to be virtually free of friction with, a bearing receptacle fixed to the casing.

22 Claims, 3 Drawing Sheets

EXHAUST-GAS TURBOCHARGER FOR AN INTERNAL COMBUSTION ENGINE

BACKGROUND AND SUMMARY OF THE INVENTION

This application claims the priority of German Application No. 100 11 419.9, filed Mar. 9, 2000, the disclosure of which is expressly incorporated by reference herein.

The invention relates to an exhaust-gas turbocharger for an internal combustion engine.

A known exhaust-gas turbocharger is described in the German Patent document DE 36 28 687 A1. The exhaust-gas turbocharger comprises an exhaust-gas turbine which is arranged in the exhaust tract and is driven by the exhaust-gas back pressure of the internal combustion engine. Also, in the intake tract, a compressor, which is operated by the exhaust-gas turbine via a shaft, compresses fresh intake air to an increased boost pressure. The shaft of the exhaust-gas turbocharger is supported in the compressor casing via two rolling bearings. In order to achieve vibration-damped mounting, in each case at least one rolling bearing is supported in the compressor casing, with a gap-like damping space being included as a hydraulic cushion and/or with a radially acting spring body being included. This type of mounting constitutes a spring damper system which makes it possible to avoid the situation where the critical rotational speed of the shaft may be set in the range near the maximum rotational speed of the exhaust-gas turbocharger.

Rotor mountings of this type have, in principle, incorporated a potential for improvement in terms of turbocharger efficiency in connection with the friction occurring at the bearing point between the shaft and the bearing receptacle. Particularly in the range of low turbocharger rotational speeds, a considerable percentage of the turbine power is lost in the form of bearing power loss, so that, in the part-load range of the internal combustion engine, a merely reduced boost pressure may be built up, this manifesting itself in a delayed response behavior of the internal combustion engine during acceleration.

Another problem is that the bearings have to be supplied with lubricating oil, which presupposes an oil pump and an oil supply line to the bearings. The supply of oil normally takes place via the oil circuit of the internal combustion engine. For reasons of construction, the situation cannot be ruled out where leakages occur both on the turbine side and on the compressor side in the exhaust-gas turbocharger, with lubricating oil escaping into the exhaust-gas side or into the air side of the engine via these leakages. In addition to the air and the exhaust gas being polluted with lubricating oil, there is also the fear that various components of the internal combustion engine, for example a charge-air and exhaust-gas recirculation cooler or a soot filter, may be contaminated with oil.

The undesirable infiltration of the lubricating oil into air and exhaust gas or the contamination of various components with oil necessarily represent a loss of lubricating oil which has to be regularly compensated. Moreover, the high temperatures on the exhaust-gas side in the region of the turbine damage the oil, and the useful life of the oil is reduced.

The problem on which the invention is based is to improve the efficiency of an exhaust-gas turbocharger for an internal combustion engine. The ease with which the internal combustion engine is maintained and the useful life of the exhaust-gas turbocharger are also expediently to be improved.

This problem is solved, according to the invention, by an exhaust-gas turbocharger for an internal combustion engine, comprising an exhaust-gas turbine in the exhaust tract, and a compressor in the intake tract. The exhaust-gas turbine and the compressor are connected via a shaft which is supported in a casing of the exhaust-gas turbocharger via at least one bearing. The bearing has a non-contact design, such that, when the exhaust-gas turbocharger is in operation, the shaft is held at a distance from, and so as to be virtually free of friction with, a bearing receptacle fixed to the casing.

According to the innovation, the bearing of the rotor shaft of the exhaust-gas turbocharger in the casing has a non-contact design, in that, at least when the exhaust-gas turbocharger is in operation, the shaft is held at a distance, with a bearing gap, from the bearing receptacle fixed to the casing. A virtually friction-free mounting of the shaft in this case is thereby possible, with the result that the efficiency of the turbocharger, particularly at low rotational speeds, is appreciably improved, since virtually no bearing losses occur any longer. The response behavior of the internal combustion engine is improved, because, even in the low rotational-speed range of the internal combustion engine and with a correspondingly low exhaust-gas back pressure, a notable turbine power can be generated, which is transmitted via the shaft to the compressor. Thus, even in the lower rotational-speed range, this brings about an increase in the boost pressure and therefore, concomitantly, an increase in the power of the internal combustion engine.

Moreover, the result of the friction-free mounting is that the use of lubricating oil may be dispensed with. As a consequence of which, on the one hand, the design of the exhaust-gas turbocharger is appreciably simplified, because devices for supplying oil to the turbocharger are no longer required and, on the other hand, the problem of undesirable contamination of the intake air, the exhaust gas or various assemblies of the internal combustion engine with oil, is avoided. Furthermore, there is no fear that the quality of the engine oil will be impaired because the oil is heated to an undesirable extent, nor do any additional oil losses occur.

According to a first advantageous development, the bearing is designed as an air bearing, in which an air gap is formed between the shaft and the bearing receptacle fixed to the casing. Air, which can expediently be supplied via an air supply device, flows into the air gap, the air bearing advantageously being designed as an aerodynamic bearing, in which the supplied air flows through the air gap, with the result that a supporting air cushion is generated. As a result of the compressibility of the air, when the shaft rotates, an over pressure zone and an under pressure zone are formed, the pressure difference ensuring adjustment or centering of the shaft in the bearing receptacle.

Alternatively to an aerodynamic bearing, an aerostatic bearing may also be used, in which air is pressed into the bearing gap from outside. When the bearing is under load, a higher pressure is formed in the narrowed bearing gap than in the widened bearing gap; this pressure difference gives rise to the load-bearing capacity. Aerostatic bearings may expediently be used in the case of shafts in which a relatively high load is to be expected.

According to a second advantageous version, which may be used both alternatively to and in addition to the air bearing, the bearing is designed as a magnetic bearing and forms, in particular, part of an electric motor, in which the shaft of the exhaust-gas turbocharger or a component connected to and rotating with the shaft is identical to the rotor or armature of the electric motor. The design as an electric motor affords the advantage that, in addition to the non-contact and friction-free mounting of the shaft, an additional drive of the shaft is provided, which, particularly in ranges of low exhaust-gas back pressure, can be cut-in in order to achieve an increase in boost pressure. By contrast, in ranges of higher exhaust-gas back pressure, the electric motor can be operated as a generator.

In a preferred embodiment, an additional contact bearing, in particular a rolling bearing, is provided, which takes effect in operating states where the supporting force of the non-contact bearing is not sufficient. Particularly when an air bearing is used, the contact bearing affords the advantage that the dry or mixed friction that occurs when an aerodynamic air bearing is started up, and that leads to an increased starting torque and wear can be compensated or reduced by means of the contact bearing.

Other objects, advantages and novel features of the present invention will become apparent from the following detailed description of the invention when considered in conjunction with the accompanying drawings.

DETAILED DESCRIPTION OF THE DRAWINGS

Identical components are given the same reference symbols in the figures described below.

Figure 1:
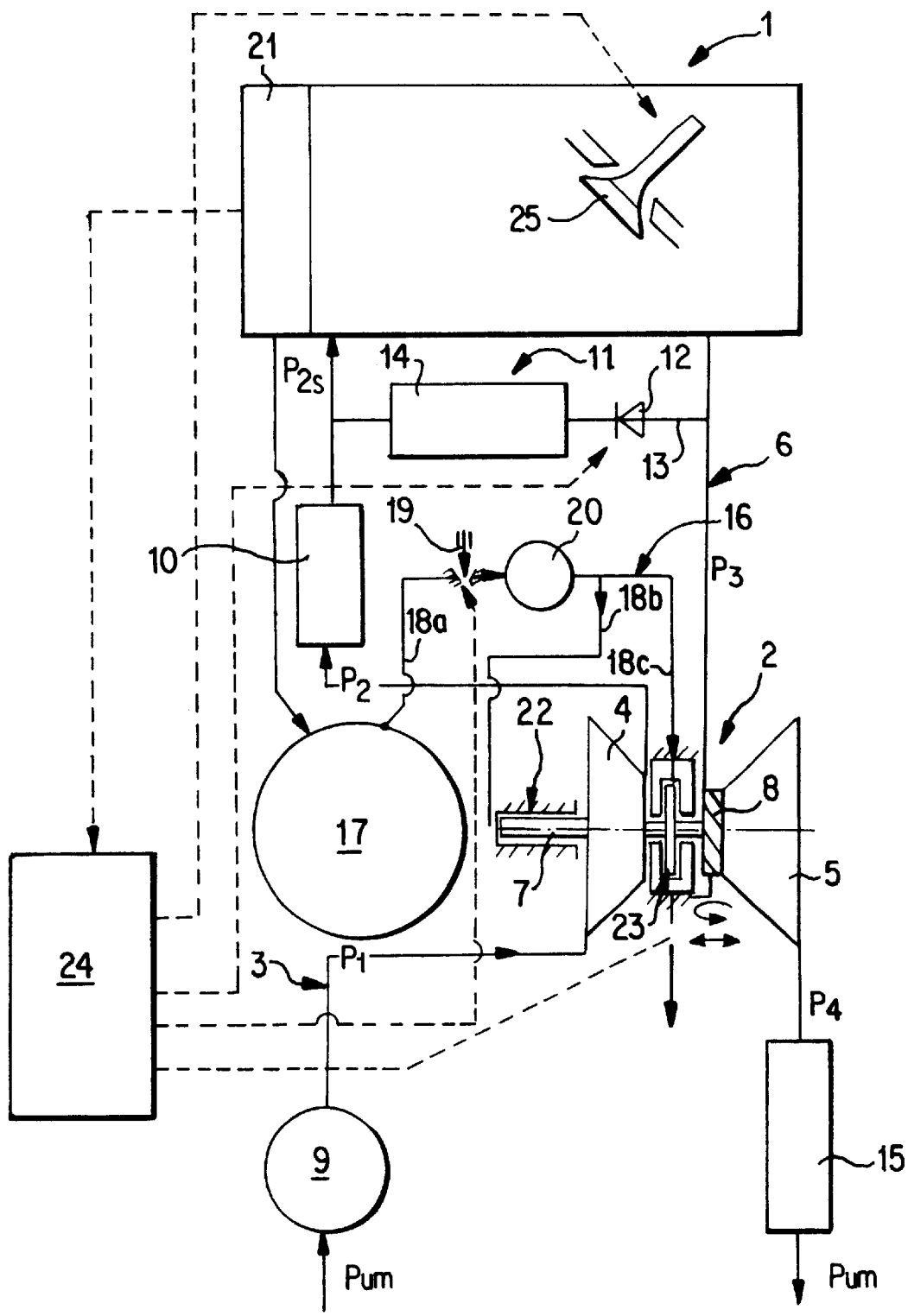
FIG. 1 is a diagrammatic illustration of a charged internal combustion engine which has an air cell supplying the air bearings of the exhaust-gas turbocharger.

The internal combustion engine 1 generally illustrated in FIG. 1 is assigned an exhaust-gas turbocharger 2, which comprises a compressor 4 in the intake tract 3 and a turbine 5 in the exhaust tract 6. The exhaust-gas turbine 5 is driven by the pressurized exhaust gases from the internal combustion engine 1. The rotational movement of the exhaust-gas turbine 5 is transmitted via a shaft 7 to the compressor 4 which sucks in combustion air at the ambient pressure $p_{um}$ and compresses it to an increased boost pressure $p_2$.

The turbine 5 is expediently equipped with a variable turbine geometry 8, which makes it possible to set the effective turbine inlet cross section variably as a function of the state of the internal combustion engine. As a result, an increase in the drive power or brake power can be achieved both in the powered driving mode and in the engine-braking mode. The variable turbine geometry may take the form of an axially displaceable guide-vane cascade, a guide-vane cascade with rotary vanes or else a varioturbine which is designed, for example, as a flap turbine with flow directed towards the turbine wheel and which can be shut off via a flap.

Provided in the intake tract 3 of the internal combustion engine is an air filter 9, in which the combustion air sucked in at ambient pressure $p_{um}$ is filtered. After filtration, the purified combustion air is delivered at the pressure $p_1$ to the compressor 4. Directly downstream of the compressor 4, the compressed combustion air has the boost pressure $p_2$. The compressed combustion air is first cooled in a charge-air cooler 10 and is subsequently supplied to the cylinder inlet of the engine at the boost pressure $p_{2s}$.

Also provided is an exhaust-gas recirculation system 11 which consists of an adjustable recirculation valve 12 in a recirculation line 13 between the exhaust tract 6 and the intake tract 3 and also of an exhaust-gas recirculation cooler 14 downstream of the valve 12 in the recirculation line 13.

A silencer and a catalyst 15 are arranged in the exhaust tract 6 downstream of the turbine 5. The exhaust gas in the exhaust tract 6 enters the turbine 5 at the exhaust-gas back pressure $p_3$, and, downstream of the turbine 5, the exhaust gas has the expanded outlet pressure $p_4$ at which the exhaust gas is supplied to the silencer or catalyst 15. After flowing through the silencer or catalyst, the purified exhaust gas is discharged into the atmosphere at the ambient pressure $p_{um}$.

The exhaust-gas turbocharger 2 advantageously has an air mounting, via which the shaft 7 of the exhaust-gas turbocharger 2 is held in a bearing receptacle of the turbocharger casing in a non-contact and friction-free manner. In order to assist and maintain the air mounting, an air supply device 16 is provided, via which air (if appropriate pressurized air) can be supplied, as required or permanently, to the air bearing in the exhaust-gas turbocharger 2. The air supply device 16 comprises an air cell 17 which communicates via air supply lines 18a, 18b and 18c with various air bearings in the exhaust-gas turbocharger 2, an adjustable air supply valve 19 in the supply line 18a and an air filter 20 located downstream of the air supply valve 19. A pump 21 is also provided, which is operated by the engine and supplies the air cell 17 with air.

If appropriate, the air supply device 16 may also be supplied directly by the air pump 21. In this case, the air cell may be eliminated.

The exhaust-gas turbocharger 2 has a first air bearing designed as a radial bearing 22 and a second air bearing designed as a radial/axial bearing 23, the first radial bearing 22 being arranged in the region of the compressor 4 and the second radial/axial bearing 23 being arranged symmetrically in the turbocharger between the compressor 4 and the turbine 5. The air supply line 18b extends axially into the radial bearing 22 and the air supply line 18c extends radially into the radial/axial bearing 23.

The internal combustion engine 1 is also assigned a regulating and control unit 24, via which the various assemblies of the internal combustion engine and the internal combustion engine itself can be controlled and regulated. The regulating and control unit 24 communicates with (1) actuators of brake valves 25 in the internal combustion engine, (2) injection devices of the internal combustion engine, (3) air supply devices for the internal combustion engine, (4) the exhaust-gas recirculation system 11, (5) the actuating member of the variable turbine geometry 8 of the exhaust-gas turbine 5, (6) the air supply valve 19 of the air supply device 16, and (7) the pump 21 which is assigned to the air supply device 16.

Figure 2:
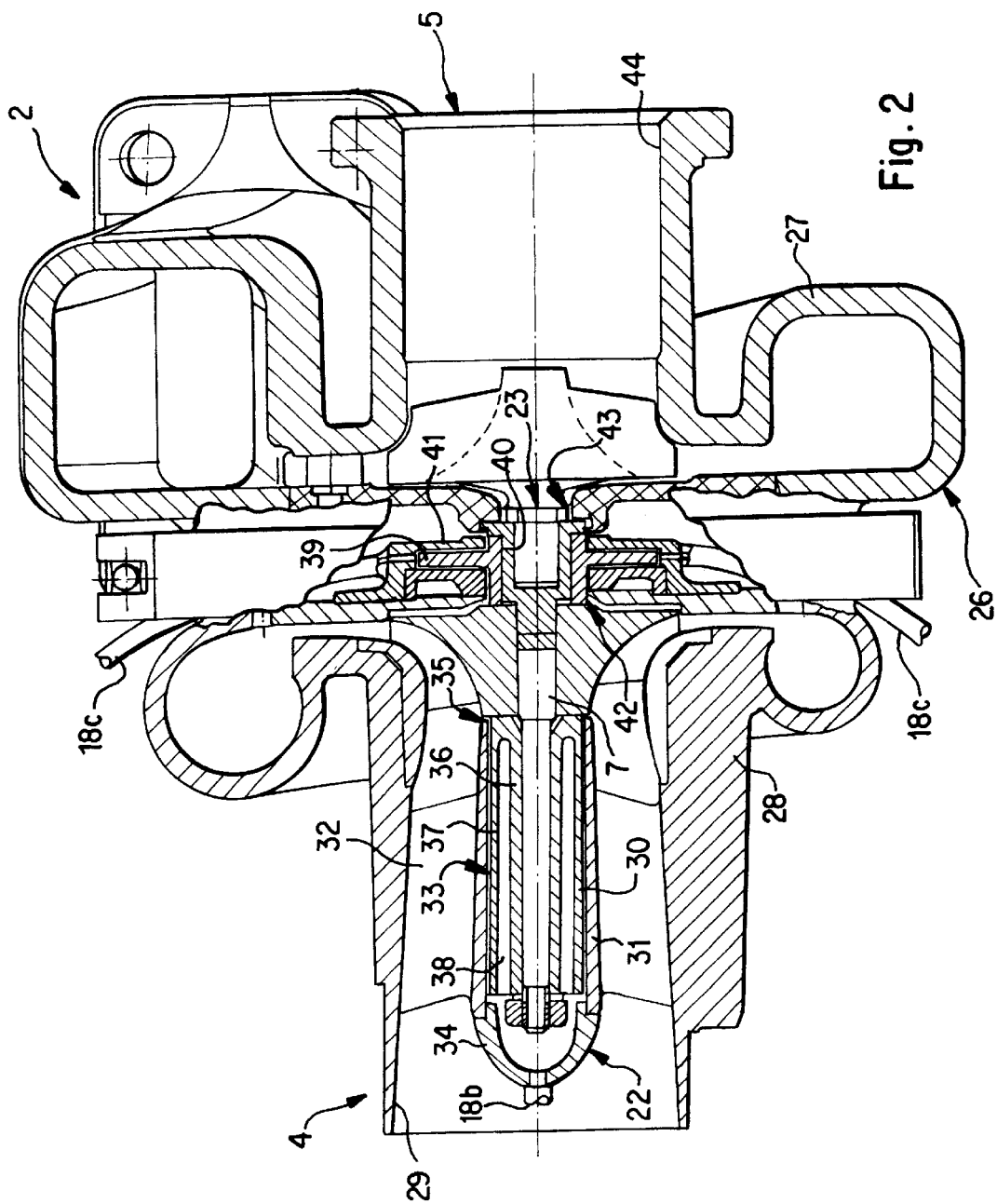
FIG. 2 is a cross-section through an exhaust-gas turbocharger, the shaft of which is held in the turbocharger casing in a non-contact manner.

FIG. 2 illustrates in cross section an exhaust-gas turbocharger 2 mounted in a non-contact and friction-free manner. The exhaust-gas turbocharger 2, together with the compressor 4 and the turbine 5, in a turbocharger casing 26, has the two bearings 22 and 23 which, in the exemplary embodiment, are designed as air bearings and via which the shaft 7 of the exhaust-gas turbocharger 2 is supported relative to the turbocharger casing 26. The bearing 22 is designed as a radial bearing and is located on the compressor side 4 in the compressor casing 28, which forms part of the turbocharger casing 26. The radial bearing 22 extends axially into the air inlet duct 29 of the compressor 4. The radial bearing 22 consists, on the shaft side, of an inner bearing sleeve 30 which is connected to the shaft 7 of the exhaust-gas turbocharger 2 and, on the casing side, of an outer approximately hollow-cylindrical mounting element 31 which radially surrounds the inner bearing sleeve 30 and is connected firmly to the compressor casing 28, in particular by means of supporting ribs 32 which extend radially between the inner duct wall of the air inlet duct 29 and the outer mounting element 31. The inner bearing sleeve 30 is connected releasably to the shaft 7.

In order to increase the damping capacity of the mounting, the wall thickness of the inner bearing sleeve 30 is kept very small, thus making it possible to have geometric deformation which brings about material damping. Additional damping is achieved by the outer mounting element 31 being held on the radially running supporting ribs 32.

The radial bearing 22 is advantageously designed as an air bearing, in particular as an aerodynamic air bearing. Between the outside of the inner bearing sleeve, rotating when the turbocharger is in operation, and the inside of the outer mounting element 31, held fixedly on the casing, an annular air gap 33, through which air flows when the turbocharger is in operation, is formed with the result that a supporting air cushion is formed between the rotating bearing sleeve 30 and the fixed mounting element 31.

The flow advantageously passes through the annular air gap 33 axially. The outer mounting element 31 has, on the side facing the entrance to the air inlet duct 29, a dome-shaped element 34 provided with an air inlet orifice which is connected to the air supply line 18b. Air, if appropriate pressurized air, is injected via the air supply line 18b into the interior of the outer mounting element 31. The injected air flows into the annular air gap 33 between the bearing sleeve 30 and the mounting element 31 and flows through this air gap 33 in the axial direction, with the result that the supporting air cushion is formed. Located on the end face opposite the air inlet, between the inner bearing sleeve 30 and the outer mounting element 31, is an overflow orifice 35, via which the air flowing axially through the air gap 33 re-enters the air inlet duct 29 of the compressor 4.

Alternatively or additionally to the axial entry of the inflowing air into the air gap 33, it may also be expedient for the air to be introduced radially into the annular air gap 33. The inner bearing sleeve 30 consists of an inner wall 36 and of an outer wall 37, an inner annular space 38 being formed between the inner and the outer wall 36 and 37, respectively. The inner annular space 38 is open on one axial end face; air can flow through this orifice into the inner annular space 38 and can flow out again into the annular air gap 33 via radial orifices expediently introduced in the outer wall 37.

Located approximately centrically in the exhaust-gas turbocharger 2 is a further bearing 23, which is designed as a radial/axial bearing and is expediently likewise an air bearing. The bearing 23 has both a radial and an axial supporting function. The bearing 23 consists, on the shaft side, of an inner bearing sleeve 40, which is connected firmly to the shaft 7, and of a bearing disc 39 which is seated radially on the inner bearing sleeve 40 and is connected firmly to the bearing sleeve 40. The bearing disc 39 is guided in an annular space which is delimited on the two axial sides and on the radially outer side by an annular element 41 fixed to the casing. The annular space in the annular element 41 is dimensioned such that, between the bearing disc 39 and the inner walls of the annular space, an air gap is formed axially and radially, in which a supporting air cushion can be formed. Provided on the circumferential side of the annular element 41 are air inflow orifices connected to supply lines 18c, via which air can be supplied to the annular space. The air injected radially into the annular space can flow out again via sealing gaps 42 and 43, the sealing gaps 42 and 43 being located on the radially inner side of the annular element 41 fixed to the casing and extending on axially opposite sides with respect to the bearing disc 39. The sealing gap 42 is located on the side facing the compressor 4, and air can be introduced via the sealing gap 42 from the annular space into the air flow duct through the compressor 4. The axially opposite sealing gap 43 faces the turbine 5, and air can correspondingly be guided out of the annular space via the sealing gap 43 into the exhaust-gas outlet 44 of the turbine 5.

In a further expedient version, there may be provision for at least one of the bearings operating in a non-contact and friction-free manner, in particular the radial/axial bearing 23, to be designed as a magnetic bearing and expediently form part of an electric motor. In this version, the bearing disc 39 fixed to the shaft is designed as an armature disc or as a rotor of the electric motor, and the annular element 41 fixed to the casing correspondingly forms the stator of the electric motor. This version, in addition to having the non-contact mounting, affords the additional advantage that the shaft 7 can be driven electromotively, which can be utilized for increasing the power of the internal combustion engine, particularly in engine operating ranges in which only a slight exhaust-gas back pressure is available for driving the turbine.

Figure 3:
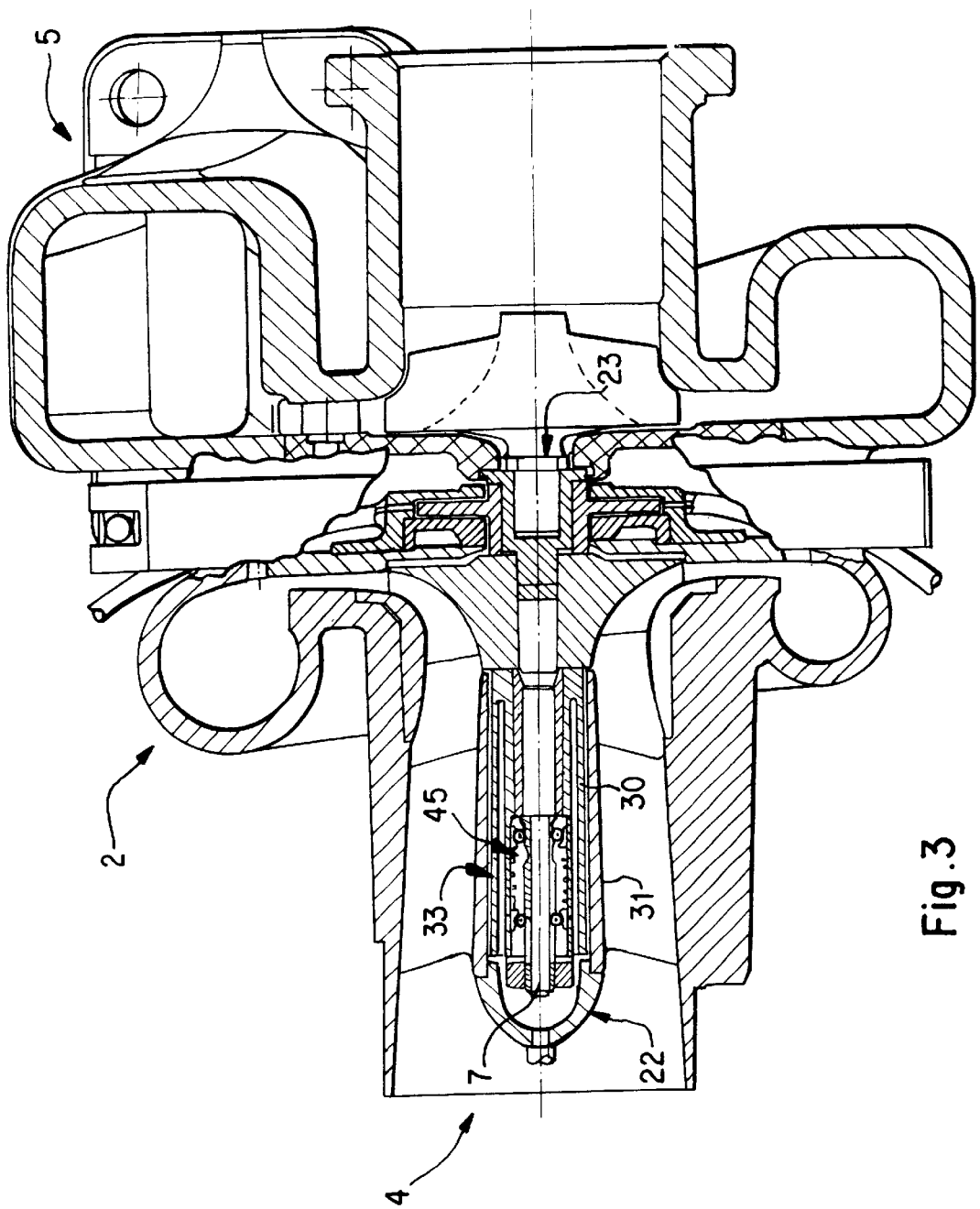
FIG. 3 is a cross-section through a further version of an exhaust-gas turbocharger which has a contact bearing in addition to the bearing operating in a non-contact manner.

The sectional illustration according to FIG. 3 shows a similar exemplary embodiment to FIG. 2, but with an additional rolling mounting which takes effect in operating states in which the supporting force of the air bearing is not sufficient. In the exemplary embodiment according to FIG. 3, the radial bearing 22 in the compressor 4 is provided with a roller mounting 45. The rolling mounting 45 is located between the shaft 7 of the exhaust-gas turbocharger 2 and the inner bearing sleeve 30 which is seated radially on the shaft 7 and, in the exemplary embodiment shown, can execute a relative rotation with respect to the shaft 7 with the aid of the roller mounting 45. If the supporting force of the air bearing is not yet sufficient to stabilize the shaft centrically, for example when the exhaust-gas turbocharger is being started up, then, by means of an eccentric displacement of the shaft 7, the bearing sleeve 30 connected to the shaft can come into contact with the inner wall of the mounting element 31 fixed to the casing. By virtue of the friction between the mounting element 31 and the bearing sleeve 30, the bearing sleeve 30 experiences a deceleration in the direction of rotation, which, however, on account of the roller mounting 45, is not transmitted or is transmitted only partially to the shaft 7, so that, in spite of a possibly eccentric position, the shaft 7 can rotate essentially unimpeded and free of friction.

As soon as a load-bearing air cushion has been formed in the annular air gap 33 between the bearing sleeve 30 and the mounting element 31, the shaft 7 is stabilized in its central position and can rotate in a completely non-contact manner.

A corresponding roller mounting or comparable contact bearing may also be provided in the case of the radial/axial bearing 23.

The roller mounting or comparable contact bearing may be combined both with air bearings and with magnetic bearings.

When air bearings are used, both aerodynamically and aerostatically designed bearings may be employed.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. An exhaust-gas turbocharger for an internal combustion engine, comprising:

an exhaust-gas turbine arranged in an exhaust tract;

a compressor arranged in an intake tract;

a shaft coupling said exhaust-gas turbine and said compressor;

at least one bearing supporting said shaft in a casing of the exhaust-gas turbocharger, said at least one bearing including an air bearing positioned in the inlet tract of the compressor such that, when the exhaust-gas turbocharger is in operation, said shaft is held at a distance from a bearing receptacle fixed to the casing so as to be virtually free of friction with the bearing receptacle.

2. The exhaust-gas turbocharger according to claim 1, wherein said air bearing has an air gap between the shaft and the bearing receptacle fixed to the casing.

3. The exhaust-gas turbocharger according to claim 2, further comprising an air supply device which supplies air to the air gap.

4. The exhaust-gas turbocharger according to claim 3, wherein said air bearing is an aerodynamic bearing, in which the air flows through the air gap.

5. The exhaust-gas turbocharger according to claim 1, wherein said air bearing is a radial bearing provided on a compressor-side of the exhaust-gas turbocharger.

6. The exhaust-gas turbocharger according to claim 2, wherein said air bearing is a radial bearing provided on a compressor-side of the exhaust-gas turbocharger.

7. The exhaust-gas turbocharger according to claim 3, wherein said air bearing is a radial bearing provided on a compressor-side of the exhaust-gas turbocharger.

8. The exhaust-gas turbocharger according to claim 4, wherein said air bearing is a radial bearing provided on a compressor-side of the exhaust-gas turbocharger.

9. The exhaust-gas turbocharger according to claim 1, wherein said at least one bearing further includes a combined axial/radial bearing provided between the exhaust-gas turbine and the compressor.

10. The exhaust-gas turbocharger according to claim 2, wherein said at least one bearing further includes a combined axial/radial bearing provided between the exhaust-gas turbine and the compressor.

11. The exhaust-gas turbocharger according to claim 3, wherein said at least one bearing further includes a combined axial/radial bearing provided between the exhaust-gas turbine and the compressor.

12. The exhaust-gas turbocharger according to claim 4, wherein said at least one bearing further includes a combined axial/radial bearing provided between the exhaust-gas turbine and the compressor.

13. The exhaust-gas turbocharger according to claim 5, wherein said at least one bearing further includes a combined axial/radial bearing provided between the exhaust-gas turbine and the compressor.

14. The exhaust-gas turbocharger according to claim 1, wherein said at least one bearing further includes a magnetic bearing.

15. The exhaust-gas turbocharger according to claim 14, wherein said magnetic bearing forms part of an electric motor, the shaft of the exhaust-gas turbocharger being a rotor of the electric motor.

16. The exhaust-gas turbocharger according to claim 2, wherein said at least one bearing further includes an electromagnetic bearing.

17. The exhaust-gas turbocharger according to claim 1, wherein said at least one bearing further includes a contact bearing.

18. The exhaust-gas turbocharger according to claim 17, wherein said contact bearing is a roller bearing.

19. The exhaust-gas turbocharger according to claim 18, wherein said roller bearing is arranged axially asymmetrically in the exhaust-gas turbocharger.

20. In an exhaust-gas turbocharger for an internal combustion engine, a method for supporting a shaft of the exhaust-gas turbocharger in a casing of the exhaust-gas turbocharger, the method comprising the acts of:

providing an air bearing located in the inlet tract of the housing which has an air gap between the shaft and a bearing receptacle fixed to the casing;

supplying air through the gap when the turbocharger is in operation to form a supporting air cushion, whereby the shaft is held at a distance from the bearing receptacle in a virtually friction free manner.

21. The method according to claim 20, wherein the act of supplying air further comprises the act of flowing the air axially through the gap.

22. The method according to claim 21, further comprising the act of introducing the air radially into the gap.

* * * * *